United States Patent
Arguelles et al.

(10) Patent No.: US 10,289,539 B1
(45) Date of Patent: May 14, 2019

(54) PERFORMANCE TESTING IN A SOFTWARE DEPLOYMENT PIPELINE

(71) Applicant: Amazon Technologies, Inc., Reno, NV (US)

(72) Inventors: Carlos Alejandro Arguelles, Shoreline, WA (US); Arthur Carre, Seattle, WA (US); Ramakrishnan Hariharan Chandrasekharapuram, Seattle, WA (US); Ayham Tannous, Seattle, WA (US); Jason Scott Wodicka, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 3 days.

(21) Appl. No.: 14/030,715

(22) Filed: Sep. 18, 2013

(51) Int. Cl.
  *G06F 9/44* (2018.01)
  *G06F 11/36* (2006.01)
  *G06F 8/60* (2018.01)
  *G06F 9/445* (2018.01)

(52) U.S. Cl.
  CPC .......... *G06F 11/3692* (2013.01); *G06F 8/60* (2013.01); *G06F 11/3664* (2013.01); *G06F 9/44589* (2013.01); *G06F 11/3684* (2013.01); *G06F 11/3688* (2013.01)

(58) Field of Classification Search
  CPC .......... G06F 9/44589; G06F 11/3664; G06F 11/3684; G06F 11/3688
  See application file for complete search history.

(56) References Cited

U.S. PATENT DOCUMENTS

| | | | |
|---|---|---|---|
| 6,892,236 B1 * | 5/2005 | Conrad et al. | 709/224 |
| 7,568,019 B1 * | 7/2009 | Bhargava et al. | 709/223 |
| 7,693,996 B2 | 4/2010 | Wexler et al. | |
| 7,890,315 B2 | 2/2011 | Meier et al. | |
| 8,051,163 B2 * | 11/2011 | Ruiz et al. | 709/224 |
| 8,074,204 B2 * | 12/2011 | Comstock et al. | 717/125 |
| 8,239,526 B2 | 8/2012 | Simpson et al. | |
| 8,448,148 B1 * | 5/2013 | Kolawa | G06F 11/3688 703/23 |
| 8,661,125 B2 * | 2/2014 | Avner | G06F 11/3495 709/224 |
| 8,732,299 B2 * | 5/2014 | Lai | G06F 11/3452 709/224 |
| 8,751,184 B2 * | 6/2014 | Gawande et al. | 702/120 |
| 8,875,091 B1 * | 10/2014 | Rouleau et al. | 717/101 |

(Continued)

OTHER PUBLICATIONS

Syer et al., "Continuous Validation of Load Test Suites", ACM, Mar. 2014, pp. 259-270; <https://dl.acm.org/citation.cfm?id=2568101>.*

(Continued)

*Primary Examiner* — S. Sough
*Assistant Examiner* — Ben C Wang
(74) *Attorney, Agent, or Firm* — Robert C. Kowert; Meyertons, Hood, Kivlin, Kowert & Goetzel, P.C.

(57) ABSTRACT

Methods and systems for performance testing in a software deployment pipeline are disclosed. One or more performance tests are automatically performed on a build of a software product in a test environment in response to deploying the build to the test environment. One or more performance metrics are collected based on the performance tests. Based on the performance metrics, the build of the software product is accepted or rejected.

20 Claims, 9 Drawing Sheets

(56) References Cited

U.S. PATENT DOCUMENTS

| | | | | |
|---|---|---|---|---|
| 8,938,719 B2* | 1/2015 | Anjan | G06F 11/3672 | 717/126 |
| 8,990,639 B1* | 3/2015 | Marr | G06F 11/30 | 714/25 |
| 9,053,070 B1* | 6/2015 | Arguelles | G06F 15/177 | |
| 9,110,496 B1* | 8/2015 | Michelsen | G06F 1/00 | |
| 9,396,092 B1* | 7/2016 | Kuo | G06F 11/3664 | |
| 9,514,034 B1* | 12/2016 | Griffin | G06F 11/3688 | |
| 9,558,465 B1* | 1/2017 | Arguelles | G06Q 10/0639 | |
| 9,647,919 B1* | 5/2017 | Arguelles | H04L 43/0888 | |
| 9,747,310 B2* | 8/2017 | Hsieh | G06F 17/30292 | |
| 2006/0085537 A1* | 4/2006 | Dickerson | H04L 67/20 | 709/224 |
| 2006/0212857 A1* | 9/2006 | Neumann et al. | | 717/140 |
| 2007/0079291 A1* | 4/2007 | Roth | | 717/124 |
| 2007/0083634 A1* | 4/2007 | Roth | | 709/223 |
| 2010/0005341 A1* | 1/2010 | Agarwal | G06F 11/3688 | 714/38.11 |
| 2010/0333092 A1 | 12/2010 | Stefansson et al. | | |
| 2011/0048977 A1* | 3/2011 | Davidson et al. | | 206/205 |
| 2012/0041858 A1* | 2/2012 | Lewis | | 705/34 |
| 2012/0046930 A1* | 2/2012 | Schaub | G06F 17/5022 | 703/13 |
| 2012/0047250 A1* | 2/2012 | Lai | G06F 11/3452 | 709/224 |
| 2012/0297251 A1* | 11/2012 | Masser | G06F 11/3688 | 714/37 |
| 2013/0086203 A1* | 4/2013 | Avner | G06F 11/3495 | 709/217 |
| 2013/0139130 A1* | 5/2013 | Anjan | G06F 11/3672 | 717/131 |
| 2013/0152047 A1* | 6/2013 | Moorthi | G06F 11/368 | 717/124 |
| 2013/0198319 A1 | 8/2013 | Shen et al. | | |
| 2013/0219220 A1* | 8/2013 | Kraus et al. | | 714/32 |
| 2013/0275585 A1* | 10/2013 | Santhanakrishnan | G06F 11/3476 | 709/224 |
| 2013/0311835 A1* | 11/2013 | Dunne | G06F 11/0793 | 714/47.3 |
| 2014/0006458 A1* | 1/2014 | Hsieh | G06F 17/30292 | 707/803 |
| 2014/0068053 A1* | 3/2014 | Ravi et al. | | 709/224 |
| 2014/0196012 A1* | 7/2014 | Cohen | G06F 11/3672 | 717/124 |
| 2014/0223418 A1* | 8/2014 | Michelsen | G06F 11/3696 | 717/135 |
| 2014/0282400 A1* | 9/2014 | Moorthi et al. | | 717/122 |
| 2015/0261903 A1* | 9/2015 | Jose | G06F 17/5063 | 716/136 |
| 2016/0191349 A1* | 6/2016 | Buege | H04L 41/5038 | 709/224 |
| 2017/0103014 A1* | 4/2017 | Segler | G06F 11/34 | |
| 2017/0180459 A1* | 6/2017 | Frank | H04L 67/10 | |
| 2017/0180487 A1* | 6/2017 | Frank | H04L 67/16 | |
| 2018/0067844 A1* | 3/2018 | Conti | G06F 11/3688 | |
| 2018/0253372 A1* | 9/2018 | Colaiacomo | G06F 11/3692 | |
| 2018/0253373 A1* | 9/2018 | Mathur | G06F 11/3692 | |

OTHER PUBLICATIONS

Ardagna et al., "Early Assessment of Service Performance Based on Simulation", IEEE, Oct. 2013, pp. 33-40; <https://ieeexplore.ieee.org/stamp/stamp.jsp?tp=&arnumber=6649675>.*

Geiger et al., "Performance Testing in Continuous Integration Environments", University of Stuttgart, Apr. 2014, pp. 1-62; <ftp://ftp.informatik.uni-stuttgart.de/pub/library/medoc.ustuttgart_fi/FACH-0188/FACH-0188.pdf>.*

* cited by examiner

PERFORMANCE TESTING IN A SOFTWARE DEPLOYMENT PIPELINE

BACKGROUND

Large-scale computing systems, such as those associated with network-based production services, have become widely available in recent years. Examples of such systems include online merchants, internet service providers, online businesses such as photo processing services, corporate networks, cloud computing services, web-based hosting services, etc. These entities may maintain large numbers of computing devices (e.g., thousands of hosts) which are hosted in geographically separate locations and which are configured to process large quantities (e.g., millions) of client requests daily or even hourly. Complex systems may include many services that interact with one another in varied ways.

In many cases, these services have not been tested properly when the services are put into production to serve requests from real-world clients. As a result, services in production may fail to perform as designed under atypical conditions or even under typical conditions. For example, services often have service level agreements (SLAs) that the services are expected to respect. The SLAs may relate to latency, scalability, throughput, etc. It may be difficult to know whether any given SLA is being respected before a service is put into production. Because performance problems may arise only after a service is in production, it may be difficult and time-consuming to identify the source of the problems in the program code for the service.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods and systems for performance testing in a software deployment pipeline are described. Using the systems and methods described herein, new builds of a software product may be automatically subjected to performance tests in a test environment as part of a deployment pipeline. A common framework may be used for generating transactions for use in the performance tests in the deployment pipeline. The performance tests may include sanity tests, latency tests, and/or load tests for scalability and throughput. The performance tests may be performed in series or in parallel, at least in part. For each performance test, various heuristics may be applied to determine whether the build passes or fails the test. If the build fails any of the tests, the developer(s) may be notified. If the build passes the tests, it may be automatically deployed to a production environment.

Figure 1:
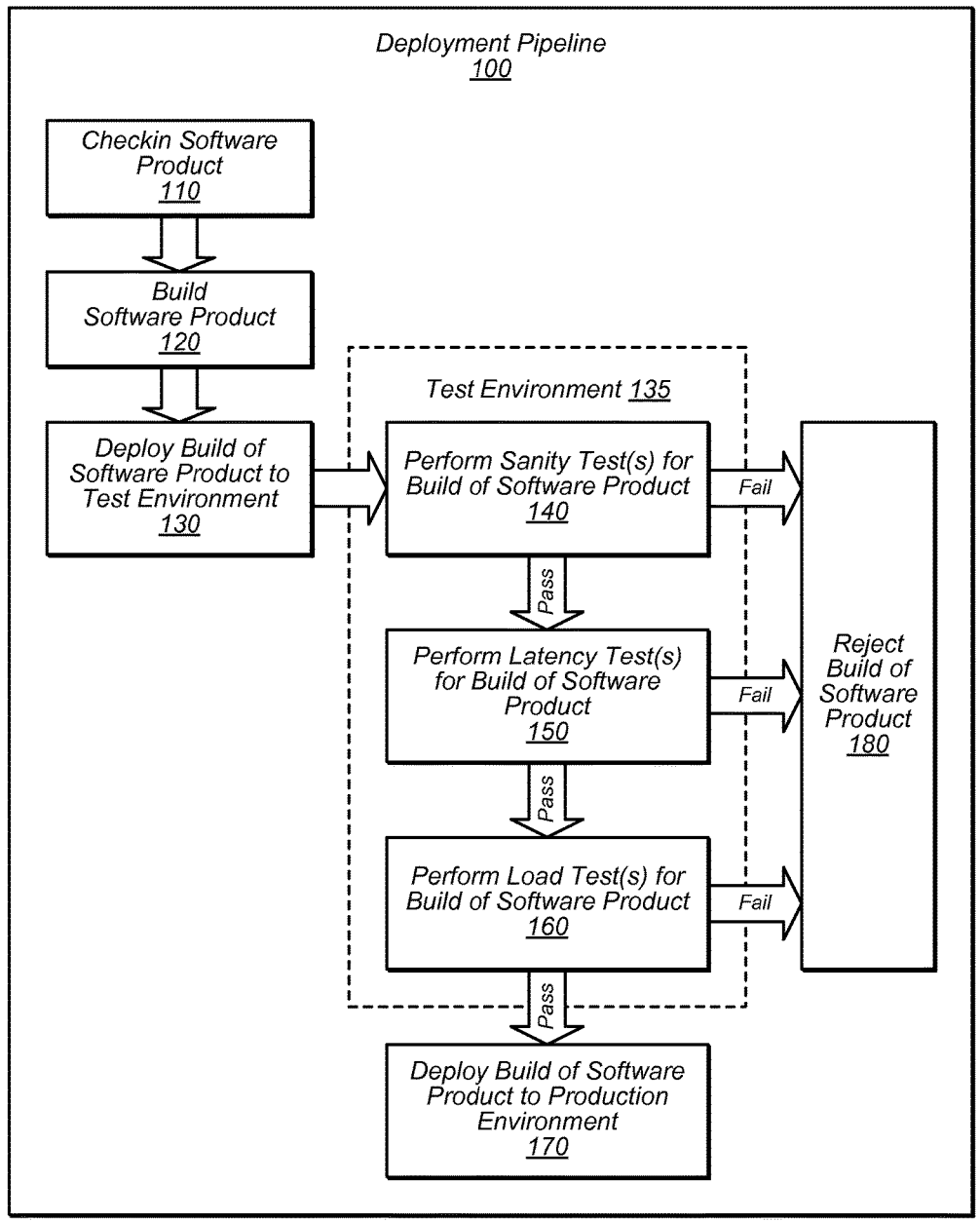
FIG. 1 illustrates an example deployment pipeline including performance testing, according to one embodiment.

FIG. 1 illustrates an example deployment pipeline including performance testing, according to one embodiment. A deployment pipeline 100 may include multiple steps in the deployment of a build of a software product. Although particular steps are shown for purposes of illustration and example, it is contemplated that the deployment pipeline 100 may include fewer steps than shown, additional steps not shown, or steps in a different order than shown. As shown in the example of FIG. 1, the deployment pipeline 100 may begin with a step 110 for a checkin of a software product. The checkin may be accomplished when a developer, acting on behalf of a development team or on behalf of herself or himself as a solo developer, submits a new version of a set of program code. If the new version is an update of a previous version of a software product, the new version may include any number of changes, additions, and/or deletions in the set of program code. In one embodiment, the software product may be checked in to a collaborative development environment.

Using the systems and methods described herein, the checkin software product step 110 may initiate a series of steps for assessing the impact of the changes on the performance of the software product. After the software product is checked in, the deployment pipeline 100 may then perform a step 120 to build the software product. In general, the build step 120 may transform the set of program code submitted in the checkin step 110 to generate an executable software product. The build of the software product may be generated using any suitable techniques, e.g., compilation of the set of program code.

After the software product is built, the deployment pipeline 100 may proceed to a step 130 to deploy the build of the software product to a test environment 135. Upon deployment to the test environment 135, the build of the software product may be executed, e.g., using one or more test hosts. In the test environment 135, the build of the software product may be insulated from real-time interaction with real-world clients, e.g., by processing only synthetic requests or prerecorded client requests that were previously captured in a production environment. For example, if the software product implements a service that is associated with an electronic commerce (e-commerce) merchant, then the service may be configured to perform one or more suitable operations such as generating a web page (e.g., a product description page for a product offered for sale by the merchant), completing a sale or other transaction between the merchant and a customer, verifying a payment presented by the customer, etc. The test environment 135 is discussed further with respect to FIG. 2B.

In the test environment 135, the build of the software product may be subjected to one or more performance tests to assess the performance impact of the build. As shown in the example of FIG. 1, three different categories of tests may be performed in three different steps: a step 140 to perform one or more sanity tests, a step 150 to perform one or more latency tests, and a step 160 to perform one or more load tests. However, it is contemplated that the performance tests may include fewer tests than shown, additional tests not shown, or tests performed in a different order than shown. As shown in the example of FIG. 1, each of the three testing steps 140, 150, and 160 may be performed in series. However, it is contemplated that any of the three testing steps 140, 150, and 160 may be performed in parallel with respect to others of the testing steps, when appropriate. In various embodiments, at least a portion of the tests within any of the testing steps 140, 150, or 160 may be performed in parallel and/or in series.

In one embodiment, the step 140 to perform the sanity test(s) may subject the build of the software product to one or more sanity tests in the test environment. The sanity test(s) may use a typical amount of load as the basis for a quick and efficient assessment of whether the build may fail to perform under typical conditions. The typical amount of load may represent an amount of load that the developer would expect the software product to encounter under typical circumstances, not exceptional circumstances, in a production environment. The sanity test(s) may cause the build to process a plurality of transactions over a period of time. For example, to simulate a typical load, the build may run at ten transactions per second for twenty minutes for a total of 12,000 transactions. The transactions may be supplied by a transaction generator based on one or more load steps, as discussed below with respect to FIG. 2A and FIG. 3.

Various performance metrics may be collected in conjunction with the sanity test(s) to determine the impact of the test(s). The performance metrics may relate to aspects of processor usage, memory usage, disk or storage usage, network usage, and/or the usage of any other measurable resource. The performance metrics may be collected using any suitable techniques, e.g., the instrumentation of various software modules and/or the use of data gathered by an operating system. The performance metrics may be used by various heuristics to determine whether the build passes or fails the sanity test(s). In one embodiment, the sanity heuristics may be predetermined or preconfigured by the developer or development team. The sanity heuristics may also include default heuristics, where appropriate. In one embodiment, a user may specify the percentile metrics to consider for the sanity heuristics (e.g., minimum, maximum, average, p50, p90, p99, etc.). In one embodiment, a user may specify which transactions to consider for the sanity heuristics: e.g., all transactions averaged, any transaction type (e.g., fail if the p90 of any transaction type has increased by 10%), or a specific transaction type (e.g., fail if the p90 of reads has increased).

In one embodiment, the sanity heuristics may implement service level agreements (SLAs) for the software product. For example, the performance metrics collected for the sanity test(s) may indicate the number of transactions processed and the pass/fail ratio. A heuristic may fail the build if the error rate exceeds a predetermined threshold (e.g., 0.1% error rate). Such a heuristic may be applied to one or more specific transaction types or to all transaction types.

In one embodiment, the step 150 to perform the latency test(s) may subject the build of the software product to one or more latency tests in the test environment. For example, the latency test(s) may be used to determine the speed with which the build responds to client requests in the test environment. The latency test(s) may not attempt to overload the software product, as in a load test, but may instead represent a typical, expected user load in a typical, expected user scenario. The latency test(s) may cause the build to process a plurality of transactions over a period of time. The transactions may be supplied by a transaction generator based on one or more load steps, as discussed below with respect to FIG. 2A and FIG. 3.

Various performance metrics may be collected in conjunction with the latency test(s) to determine the impact of the test(s). The performance metrics may relate to aspects of processor usage, memory usage, disk or storage usage, network usage, and/or the usage of any other measurable resource. The performance metrics may be collected using any suitable techniques, e.g., the instrumentation of various software modules and/or the use of data gathered by an operating system. The performance metrics may be used by various heuristics to determine whether the build passes or fails the latency test(s). In one embodiment, the latency heuristics may be predetermined or preconfigured by the developer or development team. The latency heuristics may also include default heuristics, where appropriate. In one embodiment, a user may specify the percentile metrics to consider for the latency heuristics (e.g., minimum, maximum, average, p50, p90, p99, etc.). In one embodiment, a user may specify which transactions to consider for the latency heuristics: e.g., all transactions averaged, any transaction type (e.g., fail if the p90 of any transaction type has increased by 10%), or a specific transaction type (e.g., fail if the p90 of reads has increased).

In one embodiment, the latency heuristics may implement service level agreements (SLAs) for the software product. For example, if an SLA for the software product requires that 90% of calls to a particular transaction type will not take more than 800 ms, then a corresponding heuristic may pass or fail the build based on whether the collected performance metrics satisfy the SLA.

In one embodiment, the step 160 to perform the load test(s) may subject the build of the software product to one or more load tests in the test environment. The load test(s) may be used to determine the scalability of the build under various amounts of load, including large amounts. The load test(s) may also be used to determine the throughput provided by the build under various amounts of load, including large amounts. In one embodiment, the load test(s) may apply various amounts of load to the build, e.g., increasing amounts of load. The load test(s) may cause the build to process a plurality of transactions over a period of time. The transactions may be supplied by a transaction generator based on one or more load steps, as discussed below with respect to FIG. 2A and FIG. 3.

Various performance metrics may be collected in conjunction with the load test(s) to determine the impact of the test(s). The performance metrics may relate to aspects of processor usage, memory usage, disk or storage usage, network usage, and/or the usage of any other measurable resource. The performance metrics may be collected using any suitable techniques, e.g., the instrumentation of various software modules and/or the use of data gathered by an operating system. The performance metrics may be used by various heuristics to determine whether the build passes or fails the load test(s). In one embodiment, the load heuristics may be predetermined or preconfigured by the developer or development team. The load heuristics may also include default heuristics, where appropriate. In one embodiment, a user may specify the percentile metrics to consider for the load heuristics (e.g., minimum, maximum, average, p50, p90, p99, etc.). In one embodiment, a user may specify which transactions to consider for the load heuristics: e.g., all transactions averaged, any transaction type (e.g., fail if the p90 of any transaction type has increased by 10%), or a specific transaction type (e.g., fail if the p90 of reads has increased).

In one embodiment, the load heuristics may implement service level agreements (SLAs) for the software product. For example, the load tests may increase the load (e.g., transactions per second) over time until latency or error rates violate the SLA. As another example, a specific test host may be targeted, and the deployment may fail if the single host cannot reach a target transaction frequency (e.g., 30 transactions per second). Similarly, a set of test hosts may be targeted, and the deployment may fail if the set of test hosts cannot collectively reach a target transaction frequency (e.g., 10 hosts and 300 transactions per second). As another example, a host may be flooded with a high transaction frequency with no warm-up period to verify that the build can handle an unexpected flood of traffic; the heuristic may fail the build if a particular error rate is exceeded.

In one embodiment, if the build fails any of the tests, the deployment pipeline 100 may proceed to a step 180 to reject the build of the software product. The rejection step 180 may include notifying the developer who submitted the set of program code (i.e., in checkin step 110) and/or the development team to which the submitting developer belongs. The notification of the rejection of the build may specify any suitable information, including an identification of the build, the specific performance tests that were performed, the metrics collected during the performance tests, details regarding the heuristics that the build satisfied, and/or details regarding the heuristics that the build failed to satisfy. In this manner, the developer or development team may gain insight as to the performance impact of any changes in the current build of the software product. In one embodiment, the developer may manually override the rejection generated by the deployment pipeline 100 and cause the build to be deployed to the production environment. In one embodiment, the developer may manually rerun one or more of the steps of the deployment pipeline 100 in the wake of a rejection.

In one embodiment, if the build passes all of the tests, the deployment pipeline 100 may proceed to a step 170 to deploy the build to a production environment. Upon deployment to the production environment, the build of the software product may be executed, e.g., using one or more production hosts. In the production environment, the build of the software product may interact with real-world clients, e.g., by processing client requests. The production environment is discussed further with respect to FIG. 2B. The production deployment step 170 may also include notifying the developer who submitted the set of program code (i.e., in checkin step 110) and/or the development team to which the submitting developer belongs. The notification of the deployment of the build may specify any suitable information, including an identification of the build, the specific performance tests that were performed, the metrics collected during the performance tests, and/or details regarding the heuristics that the build satisfied. In this manner, the developer or development team may gain insight as to the performance impact of any changes in the current build of the software product.

Figure 2A:
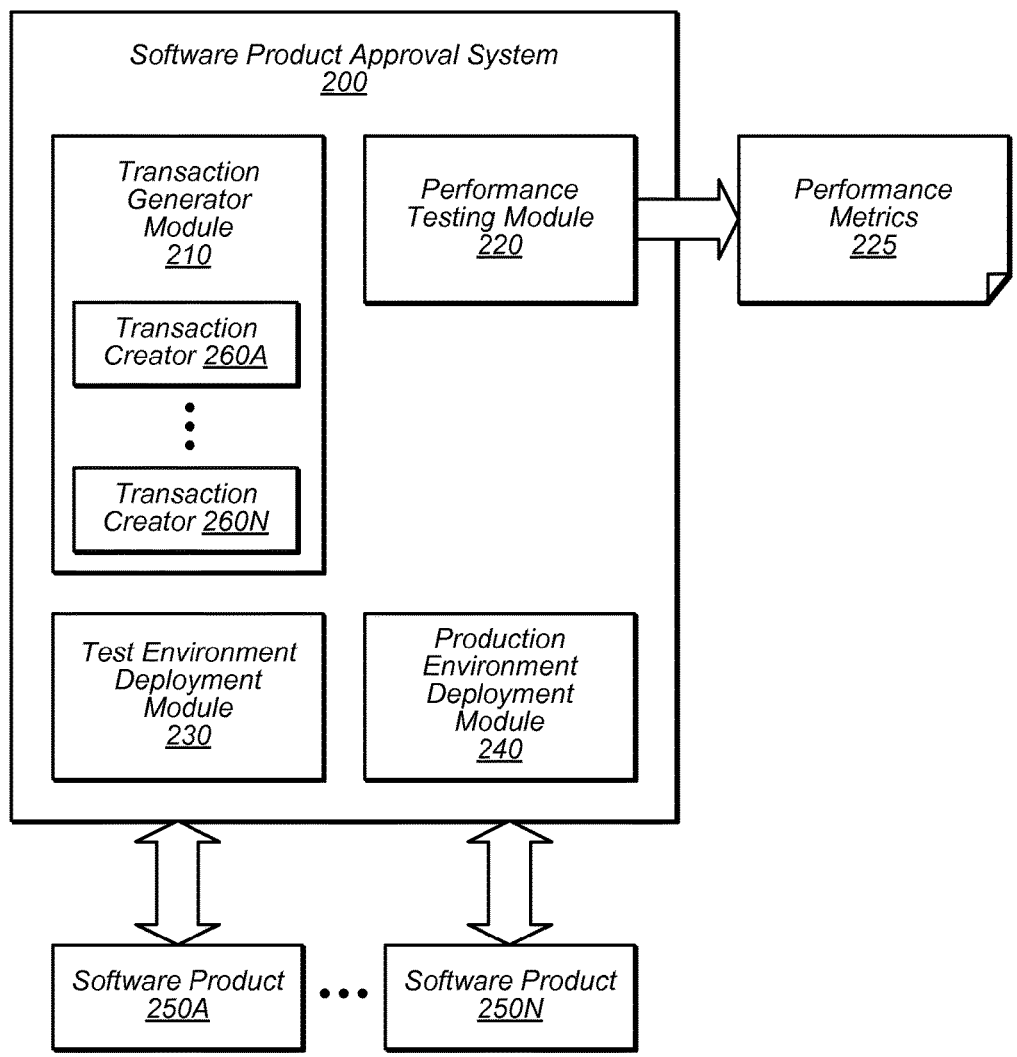
FIG. 2A illustrates an example system environment for performance testing in a software deployment pipeline, according to one embodiment.

FIG. 2A illustrates an example system environment for performance testing in a software deployment pipeline, according to one embodiment. The deployment pipeline 100 may be implemented using a software product approval system 200. The software product approval system 200 may include one or more modules that perform aspects of the functionality described above with respect to FIG. 1. In one embodiment, the software product approval system 200 may include a transaction generator module 210, a performance testing module 220, a test environment deployment module 230, and a production environment deployment module 240. It its contemplated that the software product approval system 200 may include fewer modules than shown, additional modules not shown, or different combinations or quantities of the modules shown.

Figure 7:
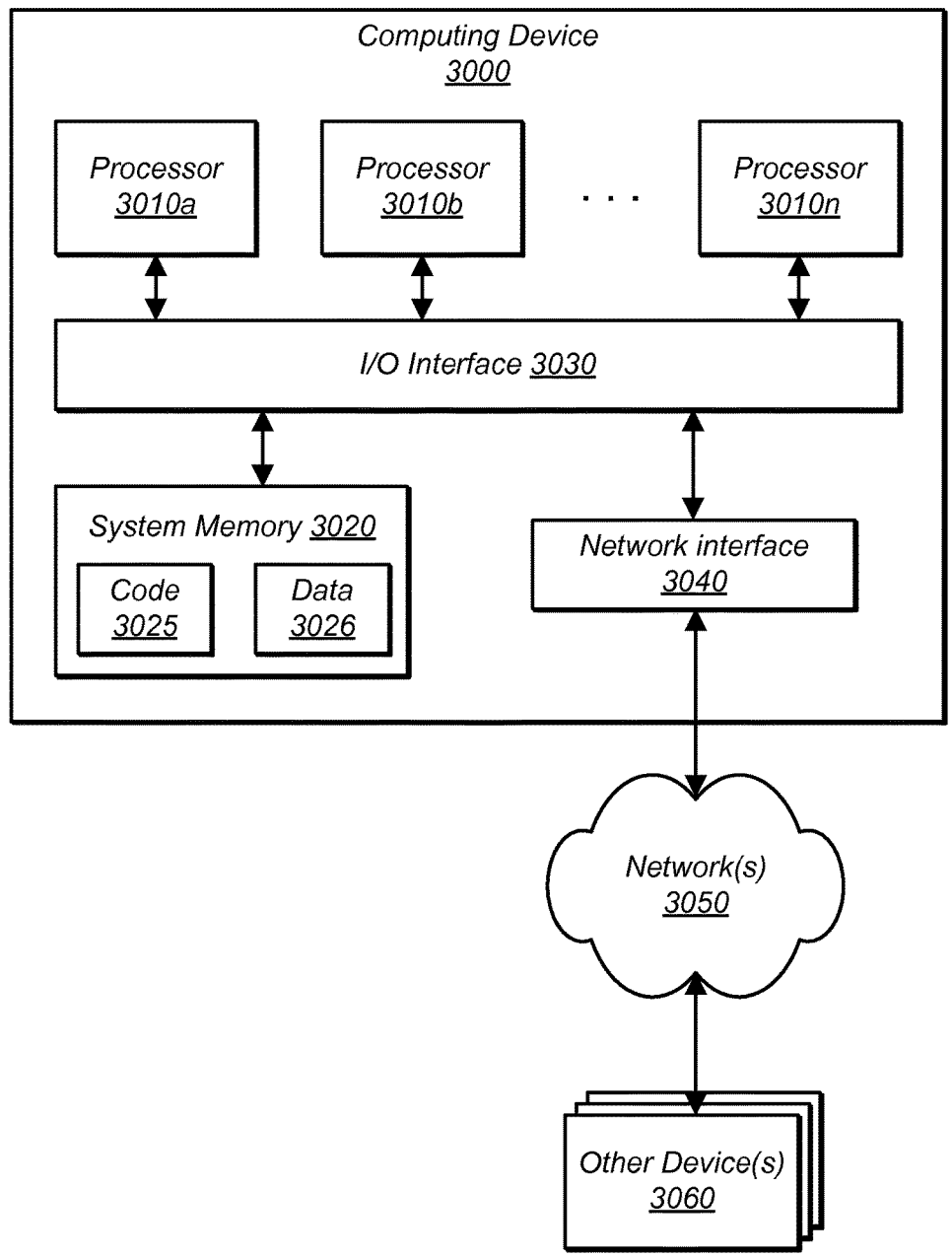
FIG. 7 illustrates an example computing device that may be used in some embodiments.

The software product approval system 200 may comprise one or more computing devices, any of which may be implemented by the example computing device 3000 illustrated in FIG. 7. In various embodiments, portions of the functionality of the different modules (e.g., transaction generator module 210, performance testing module 220, test environment deployment module 230, and production environment deployment module 240) may be provided by the same computing device or by any suitable number of different computing devices. If any of the components of the software product approval system 200 are implemented using different computing devices, then the components and their respective computing devices may be communicatively coupled, e.g., via a network. Each of the illustrated components may represent any combination of software and hardware usable to perform their respective functions.

In one embodiment, the transaction generator module 210 may be part of a generic framework that applies transactions to any suitable software product. The transaction generator module 210 may permit developers to specify a load to apply to a software product during various portions of the performance testing. In one embodiment, the transaction generator module 210 may permit a target load to be defined in terms of one or more steps of load. Each step of load may specify a target load (e.g., a transaction frequency, a number of concurrent connections, etc.), a duration for the load, and a target distribution of the transaction types in the load (e.g., a target percentage for each type of transaction out of 100%). Load steps are discussed further with respect to FIG. 3. By permitting developers to specify the rate at which to execute transactions and the distribution of transaction types, the transaction generator module 210 may permit various kinds of user scenarios and loads to be simulated during the performance tests. For example, a first scenario may specify 10% writes and 90% reads, a second scenario may specify 30% writes and 70% reads, and a third scenario may specify 100% reads. The software product approval system 200 may employ suitable performance testing to assess the different performance profiles of each scenario.

In one embodiment, the performance testing module 220 may perform aspects of the performance tests on the software products. As discussed with respect to FIG. 1, the performance tests may include one or more sanity tests, one or more latency tests, and/or one or more load tests. The performance testing module 220 may collect suitable performance metrics 225 in conjunction with the various performance tests. For example, suitable metrics may include percentile client-side latencies (e.g., p50, p90, minimum, maximum, average, etc.), the number of transactions attempted, the number of transactions that failed, the rate at which transactions were being applied, etc. The performance metrics 225 may be stored in a repository using any suitable storage technology. In various embodiments, the repository may be internal or external to the software product approval system 200. In one embodiment, the performance metrics for different builds of the same software product may be stored in the repository. Metrics for prior builds may be retrieved from the repository and compared to the metrics for a current build to determine whether the current build passes or fails the performance tests. Accordingly, the performance metrics 225 may provide a historical record of how each checkin influenced performance, latency, scale, and throughput. In various embodiments, the transaction generator module 210 and the performance testing module 220 may be jointly responsible for various aspects of the performance testing, but the specific responsibilities of the two modules may vary.

A plurality of different software products may be used in conjunction with the software product approval system 200. As shown in the example of FIG. 2A, software products 250A-250N may be submitted for automatic performance testing and potential deployment to production in the software product approval system 200. Although two software products 250A and 250N are shown for purposes of illustration and example, it is contemplated that other quantities may be used. Each of the software products 250A-250N may be configured to interact with a product-specific transaction creator. For example, the software product 250A may be configured to interact with one transaction creator 260A, and the software product 250N may be configured to interact with another transaction creator 260N. Each of the transaction creators 260A-260N may comprise program code enabling interaction between the corresponding software product and the transaction generator module 210 and/or the performance testing module 232. To implement the performance tests performed using the performance testing module 220, each transaction creator 260A-260N may provide one or more methods to be invoked. In one embodiment, each transaction creator 260A-260N may provide one or more methods to be invoked for each type of transaction that the corresponding software product can process. The methods may be invoked by the transaction generator module 210 and/or the performance testing module 232. The methods may be responsible for the low-level details of executing transactions.

Figure 2B:
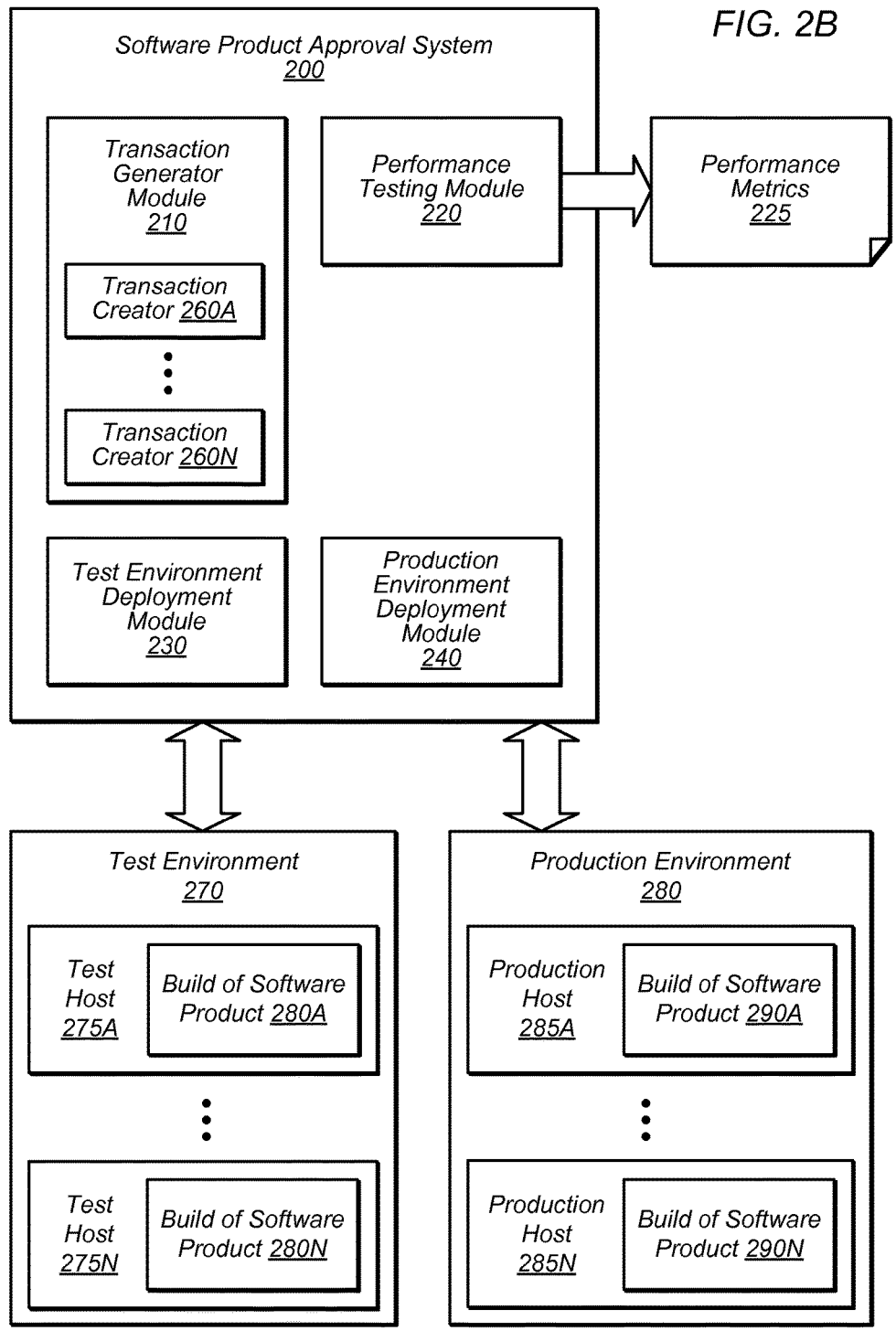
FIG. 2B illustrates further aspects of an example system environment for performance testing in a software deployment pipeline, according to one embodiment.

FIG. 2B illustrates further aspects of an example system environment for performance testing in a software deployment pipeline, according to one embodiment. In one embodiment, the test environment deployment module 230 may perform aspects of the deployment of a build of a software product to a test environment 270. For example, the test environment deployment module 230 may identify or provision one or more test hosts, e.g., from an available pool of hosts. Although two test hosts 275A and 275N are shown for purposes of illustration and example, it is contemplated that different numbers of test hosts may be used in the test environment 270. Provisioning the test hosts may comprise configuring the test hosts to match the specifications and/or configuration of one or more production hosts. In one embodiment, the test hosts may be provisioned by borrowing hosts from a pool of available test hosts or a pool of available production hosts on a temporary basis. The test environment deployment module 230 may also install or cause the installation of the build of the software product in each of the test hosts 275A-275N. For example, the test environment deployment module 230 may install or cause the installation of a first instance of the build 280A in the test host 275A and a second instance of the build 280N in the test host 275N. The test hosts 275A-275N may execute their respective instances of the build of the software product 280A-280N during the performance testing in the software deployment pipeline.

In one embodiment, the production environment deployment module 240 may perform aspects of the deployment of a build of a software product to a production environment 280. For example, the production environment deployment module 240 may identify or provision one or more production hosts, e.g., from an available pool of hosts. Although two production hosts 285A and 285N are shown for purposes of illustration and example, it is contemplated that different numbers of production hosts may be used in the production environment 280. The production environment deployment module 240 may also install or cause the installation of the build of the software product in each of the production hosts 285A-285N. For example, the production environment deployment module 230 may install or cause the installation of a first instance of the build 290A in the production host 285A and a second instance of the build 290N in the production host 285N. The production hosts 285A-285N may execute their respective instances of the build of the software product 290A-290N during interactions with real-world clients.

In some embodiments, the test hosts 275A-275N and production hosts 285A-285N may be implemented as virtual compute instances or physical compute instances. The virtual compute instances and/or physical compute instances may be offered to clients, provisioned, and maintained by a provider network that manages computational resources, memory resources, storage resources, and network resources. A virtual compute instance may comprise one or more servers with a specified computational capacity (which may be specified by indicating the type and number of CPUs, the main memory size, and so on) and a specified software stack (e.g., a particular version of an operating system, which may in turn run on top of a hypervisor). One or more virtual compute instances may be implemented by the example computing device 3000 illustrated in FIG. 7.

Figure 3:
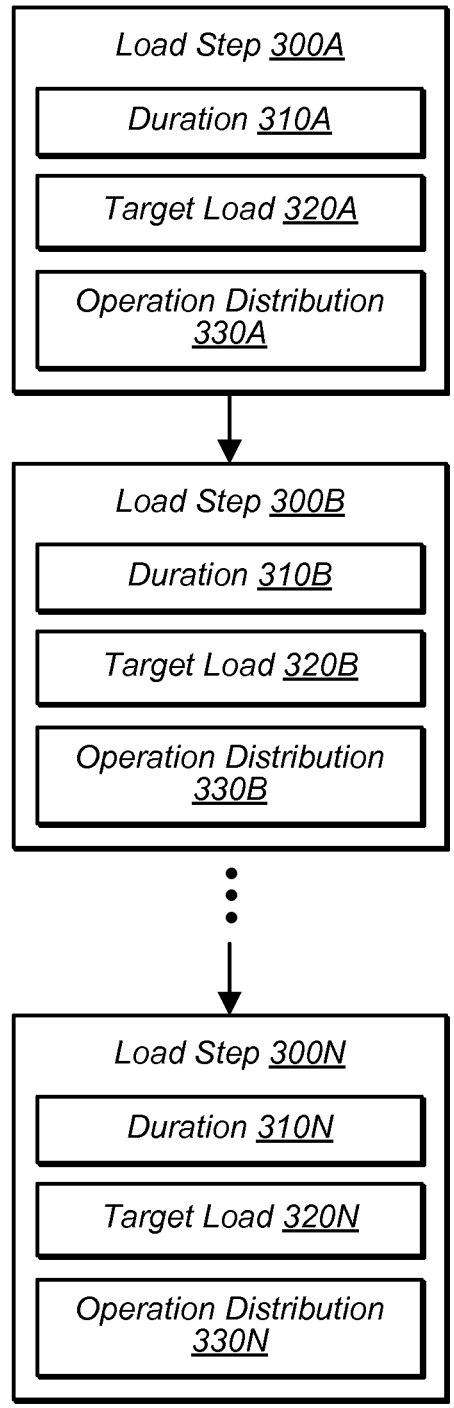
FIG. 3 illustrates an example of load steps usable for performance testing in a software deployment pipeline, according to one embodiment.

FIG. 3 illustrates an example of load steps usable for performance testing in a software deployment pipeline, according to one embodiment. A performance test of a service may include multiple steps of load. The load steps may vary based on various characteristics, and the load steps may be ordered to vary the characteristics of the performance test over time. For example, a first load step 300A may be placed before a second load step 300B in a performance test. The load steps may be ordered in this manner until a final load step 300N. Although three load steps 300A, 300B, and 300N are shown for purposes of illustration and example, it is contemplated that any number and configuration of load steps may be used with the systems and methods described herein for performance testing in a software deployment pipeline.

Each load step may specify a duration of time for which the load should be generated. For example, the first load step 300A may specify a duration 310A, the second load step 300B may specify a duration 310B, and the final load step 300N may specify a duration 310N. Any of the durations 310A, 310B, and 310N may differ from one another. Each load step may specify a prescribed or target load to be generated, such as a transaction frequency (e.g., a number expressed in transactions per second) or a number of concurrent connections. For example, the first load step 300A may specify a target load 320A, the second load step 300B may specify a target load 320B, and the final load step 300N may specify a target load 320N. Any of the target loads 320A, 320B, and 320N may differ from one another in quantity and/or type of load. Each load step may specify a distribution of operations associated with the load to be generated. For example, the first load step 300A may specify an operation distribution 330A, the second load step 300B may specify an operation distribution 330B, and the final load step 300N may specify an operation distribution 330N. Any of the operation distributions 330A, 330B, and 330N may differ from one another.

The operation distribution may indicate the different transaction types to be performed and the percentage of the total for each transaction type. For example, an operation distribution may specify 30% write operations and 70% read operations. Additionally, a load step may include or reference one or more sets of program code to be executed to implement the job. The program code may be executable to generate a synthetic load based on the parameters of the test job description. In some embodiments, different transaction types in the operation distribution may have their own sets of program code. For some transaction types, the program code may be executable to generate values within a predetermined range of input data.

The nature of a test job may vary based on the nature of the service to be load tested. For example, if the service under test is associated with an electronic commerce (e-commerce) merchant, then the service may be configured to perform one or more suitable operations such as generating a web page (e.g., a product description page for a product offered for sale by the merchant), completing a sale or other transaction between the merchant and a customer, verifying a payment presented by the customer, etc. Each test job may comprise data associated with a plurality of transactions or other operations that are processed by the service. The jobs may vary in the transaction frequency (e.g., transactions per second) they are expected to maintain or in the number of concurrent connections that are expected to establish. In some embodiments, the data associated with the test jobs may be generated by sampling actual production transactions and/or by generating synthetic transactions.

Figure 4:
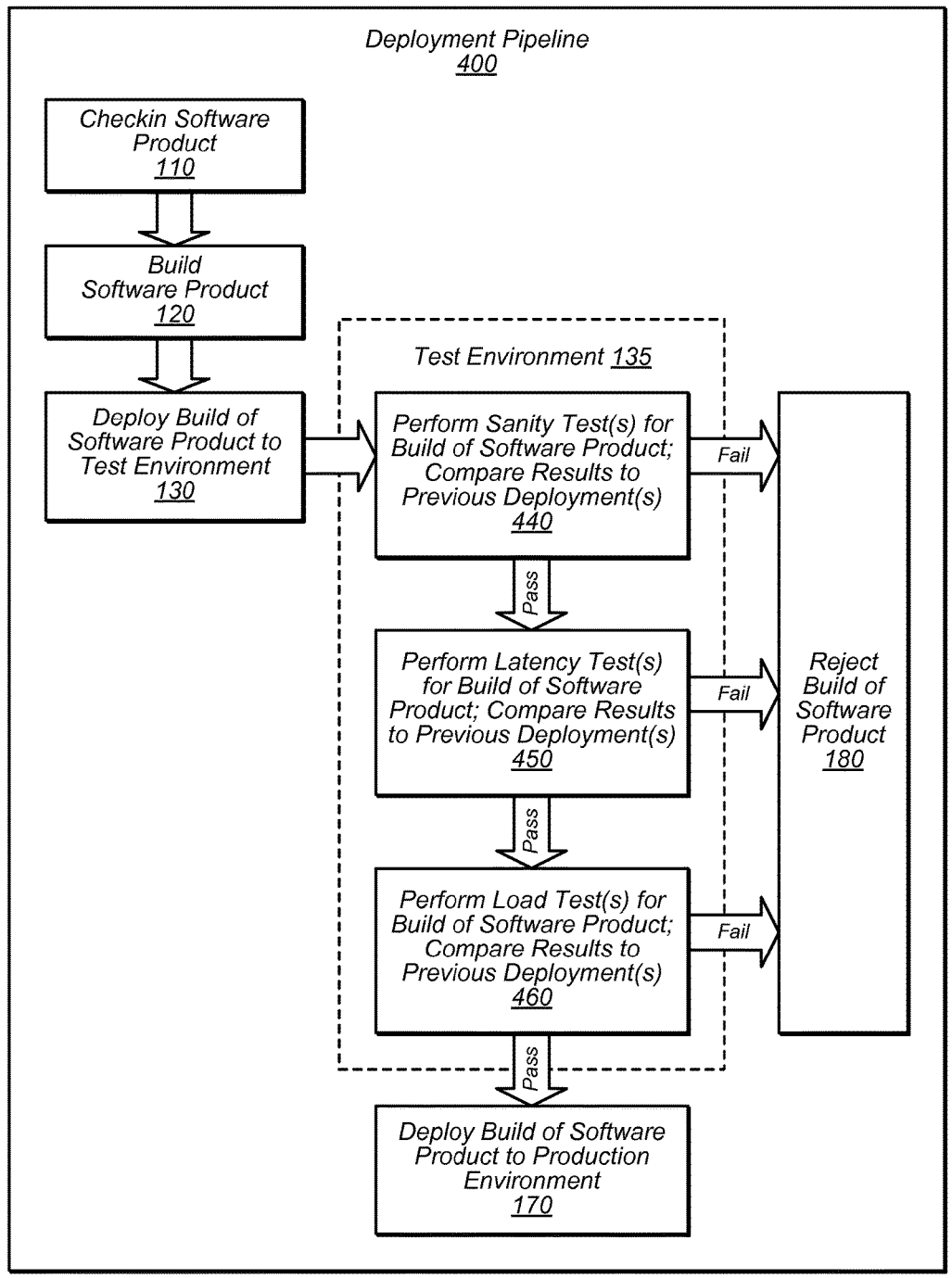
FIG. 4 illustrates an example deployment pipeline including performance testing across multiple deployments over time, according to one embodiment.

FIG. 4 illustrates an example deployment pipeline including performance testing across multiple deployments over time, according to one embodiment. A deployment pipeline 400 may include multiple steps in the deployment of a build of a software product. Although particular steps are shown for purposes of illustration and example, it is contemplated that the deployment pipeline 400 may include fewer steps than shown, additional steps not shown, or steps in a different order than shown. As previously discussed with respect to FIG. 1, the deployment pipeline 400 may begin with a step 110 for a checkin of a software product. Using the systems and methods described herein, the checkin software product step 110 may initiate a series of steps for assessing the impact of the changes on the performance of the software product. After the software product is checked in, the deployment pipeline 400 may then perform a step 120 to build the software product. After the software product is built, the deployment pipeline 400 may proceed to a step 130 to deploy the build of the software product to a test environment 135. Upon deployment to the test environment 135, the build of the software product may be executed, e.g., using one or more test hosts.

In the test environment 135, the build of the software product may be subjected to one or more performance tests to assess the performance impact of the build. As previously discussed with respect to FIG. 1, three different categories of tests may be performed in three different steps: a step 440 to perform one or more sanity tests, a step 450 to perform one or more latency tests, and a step 460 to perform one or more load tests. However, it is contemplated that the performance tests may include fewer tests than shown, additional tests not shown, or tests performed in a different order than shown. As shown in the example of FIG. 4, each of the three testing steps 440, 450, and 460 may be performed in series. However, it is contemplated that any of the three testing steps 440, 450, and 460 may be performed in parallel with respect to others of the testing steps, when appropriate. In various embodiments, at least a portion of the tests within any of the testing steps 440, 450, or 460 may be performed in parallel and/or in series.

The results of any of the three testing steps 440, 450, and 460 may be compared to the results for performance testing of a prior deployment of the same software product (e.g., a prior build). Accordingly, the performance metrics for the prior deployment may be retrieved from the repository and compared to the performance metrics for the current deployment. For example, for sanity tests, the current build may fail if the error rate has increased by greater than a particular percentage from one or more prior deployments. For latency tests, in comparison to one or more prior deployments, the current build may fail if the latency has increased by more than a particular percentage overall (e.g., 10%), if the latency has increased by more than a particular percentage overall for a specific percentile only (e.g., p90 has increased), or if latency for a specific transaction type has increased by more than a particular percentage. For load tests, in comparison to one or more prior deployments, the current build may fail if the maximum amount of load that one or more hosts can handle (e.g., within the SLA) has decreased by more than a particular percentage. In general, the deployment pipeline 400 may be configured such that the current build may pass the tests if the current performance is within an acceptable range of the previous performance.

As previously discussed with respect to FIG. 1, if the current build passes all of the tests, the deployment pipeline 400 may proceed to a step 170 to deploy the build to a production environment. As also previously discussed with respect to FIG. 1, if the current build fails any of the tests, the deployment pipeline 400 may proceed to a step 180 to reject the build of the software product. The notification of the rejection of the build may specify any suitable information, including an identification of the build, the specific performance tests that were performed, the metrics collected during the performance tests, details regarding the heuristics that the build satisfied, and/or details regarding the heuristics that the build failed to satisfy, including a comparison between the current build and one or more prior builds. In this manner, the developer or development team may gain insight as to the performance impact of any changes in the current build of the software product in comparison to one or more specific prior builds.

Figure 5:
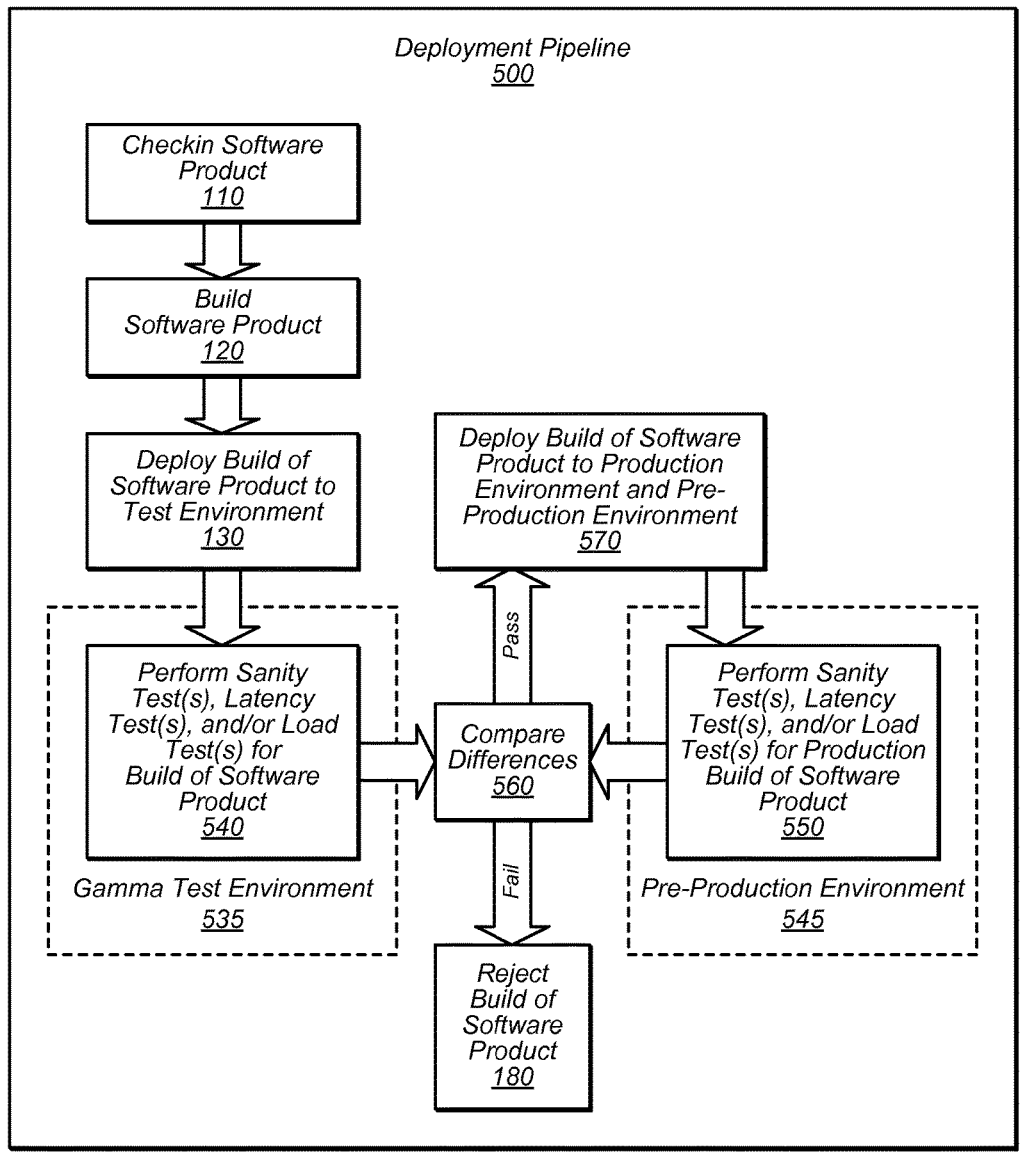
FIG. 5 illustrates an example deployment pipeline including performance testing across multiple concurrent deployments, according to one embodiment.

FIG. 5 illustrates an example deployment pipeline including performance testing across multiple concurrent deployments, according to one embodiment. A deployment pipeline 500 may include multiple steps in the deployment of a build of a software product. Although particular steps are shown for purposes of illustration and example, it is contemplated that the deployment pipeline 500 may include fewer steps than shown, additional steps not shown, or steps in a different order than shown. As previously discussed with respect to FIG. 1, the deployment pipeline 500 may begin with a step 110 for a checkin of a software product. Using the systems and methods described herein, the checkin software product step 110 may initiate a series of steps for assessing the impact of the changes on the performance of the software product. After the software product is checked in, the deployment pipeline 500 may then perform a step 120 to build the software product. After the software product is built, the deployment pipeline 500 may proceed to a step 130 to deploy the build of the software product to a gamma test environment 535. Upon deployment to the gamma test environment 535, the build of the software product may be executed, e.g., using one or more test hosts.

In some cases, differences in latency or throughput between two deployments may be due to external dependencies. Because the negative impact from the external dependencies may be temporary, the deployment pipeline 500 may simultaneously test two builds in two environments having the same dependencies in order to assess the performance of the current build against a baseline. In a gamma test environment 535, the current build of the software product may be subjected to one or more performance tests to assess the performance impact of the current build. As previously discussed with respect to FIG. 1, three different categories of tests may be performed in a performance testing step 540 in the gamma test environment 535: one or more sanity tests, one or more latency tests, and/or one or more load tests. The sanity tests, latency tests, and/or load tests may be performed in series or in parallel. Similarly, in a pre-production environment 545, a production build of the software product may be subjected to one or more identical performance tests to assess the performance impact of the production build. As previously discussed with respect to FIG. 1, three different categories of tests may be performed in a performance testing step 550 in the pre-production environment 535: one or more sanity tests, one or more latency tests, and/or one or more load tests. The sanity tests, latency tests, and/or load tests may be performed in series or in parallel. Steps 540 and 550 may be performed substantially simultaneously or concurrently.

After performing the tests in steps 540 and 550, the deployment pipeline 500 may proceed to a step 560 to compare the results of the testing steps 540 and 550 and determine any differences. As discussed above with respect to FIG. 4, the current build may pass or fail based on a comparison of the performance metrics between the two builds in the two environments. For example, for sanity tests, the current build may fail if the error rate exceeds that of the production build by a particular percentage. For latency tests, in comparison to the production build, the current build may fail if the latency is greater by more than a particular percentage overall (e.g., 10%), if the latency is greater by more than a particular percentage overall for a specific percentile only (e.g., p90 has increased), or if latency for a specific transaction type is greater by more than a particular percentage. For load tests, in comparison to the production build, the current build may fail if the maximum amount of load that one or more hosts can handle (e.g., within the SLA) is lower by more than a particular percentage.

If the current build passes all of the tests, the deployment pipeline 500 may proceed to a step 150 to deploy the build to both the production environment and the pre-production environment 545. As previously discussed with respect to FIG. 1, if the current build fails any of the tests, the deployment pipeline 500 may proceed to a step 180 to reject the build of the software product. The notification of the rejection of the build may specify any suitable information, including an identification of the build, the specific performance tests that were performed, the metrics collected during the performance tests, details regarding the heuristics that the build satisfied, and/or details regarding the heuristics that the build failed to satisfy, including a comparison between the current build and the production build. In this manner, the developer or development team may gain insight as to the performance impact of any changes in the current build of the software product while eliminating the negative impact of external dependencies.

Figure 6A:
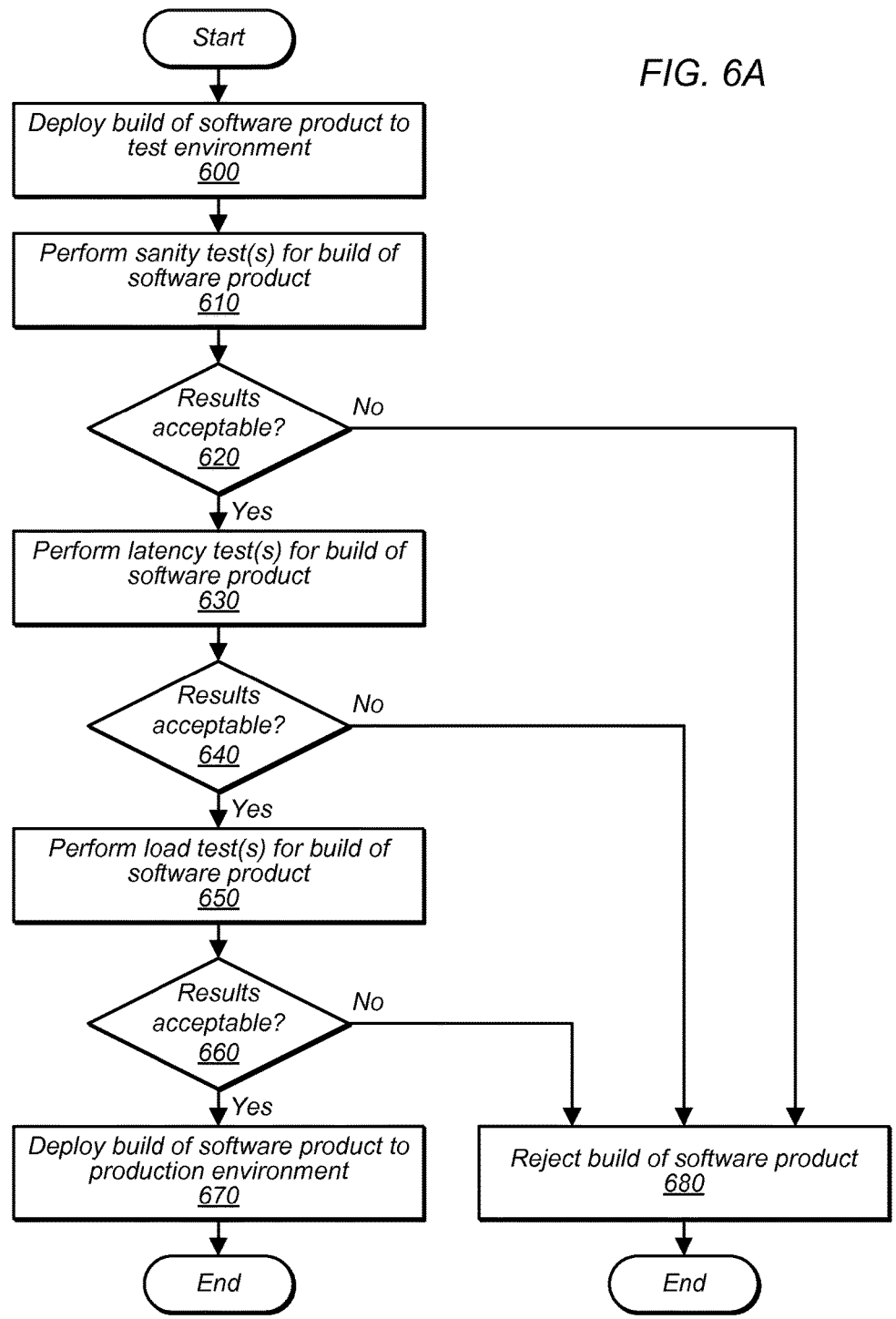
FIG. 6A is a flowchart illustrating a method for performance testing in a software deployment pipeline, according to one embodiment.

FIG. 6A is a flowchart illustrating a method for performance testing in a software deployment pipeline, according to one embodiment. As shown in 600, a build of a software product may be deployed to a test environment. In some embodiments, the build may be automatically deployed in response to the generation of the build (e.g., by compiling a set of program code) and/or the submission of the build or the corresponding program code by a developer to a deployment pipeline.

As shown in 610, one or more sanity tests may be automatically performed for the build of the software product in the test environment. The sanity tests may be automatically performed based on the deployment of the build to the test environment, on the checkin of the program code, on the generation of the build, or on any combination thereof. One or more performance metrics may be collected in conjunction with the sanity test(s). As shown in 620, the results of the sanity test(s) may be deemed acceptable or unacceptable, e.g., based on one or more heuristics and the one or more performance metrics. If the results are not acceptable, then as shown in 680, the build is rejected. If the results are acceptable, then the method may proceed for additional performance testing.

As shown in 630, one or more latency tests may be automatically performed for the build of the software product in the test environment. The latency tests may be automatically performed based on the deployment of the build to the test environment, on the checkin of the program code, on the generation of the build, or on any combination thereof. One or more performance metrics may be collected in conjunction with the latency test(s). As shown in 640, the results of the latency test(s) may be deemed acceptable or unacceptable, e.g., based on one or more heuristics and the one or more performance metrics. If the results are not acceptable, then as shown in 680, the build is rejected. If the results are acceptable, then the method may proceed for additional performance testing.

As shown in 650, one or more load tests may be automatically performed for the build of the software product in the test environment. The load tests may be automatically performed based on the deployment of the build to the test environment, on the checkin of the program code, on the generation of the build, or on any combination thereof. One or more performance metrics may be collected in conjunction with the load test(s). As shown in 660, the results of the load test(s) may be deemed acceptable or unacceptable, e.g., based on one or more heuristics and the one or more performance metrics. If the results are not acceptable, then as shown in 680, the build is rejected. If the results are acceptable, then as shown in 670, the build of the software product may be automatically deployed to a production environment.

Figure 6B:
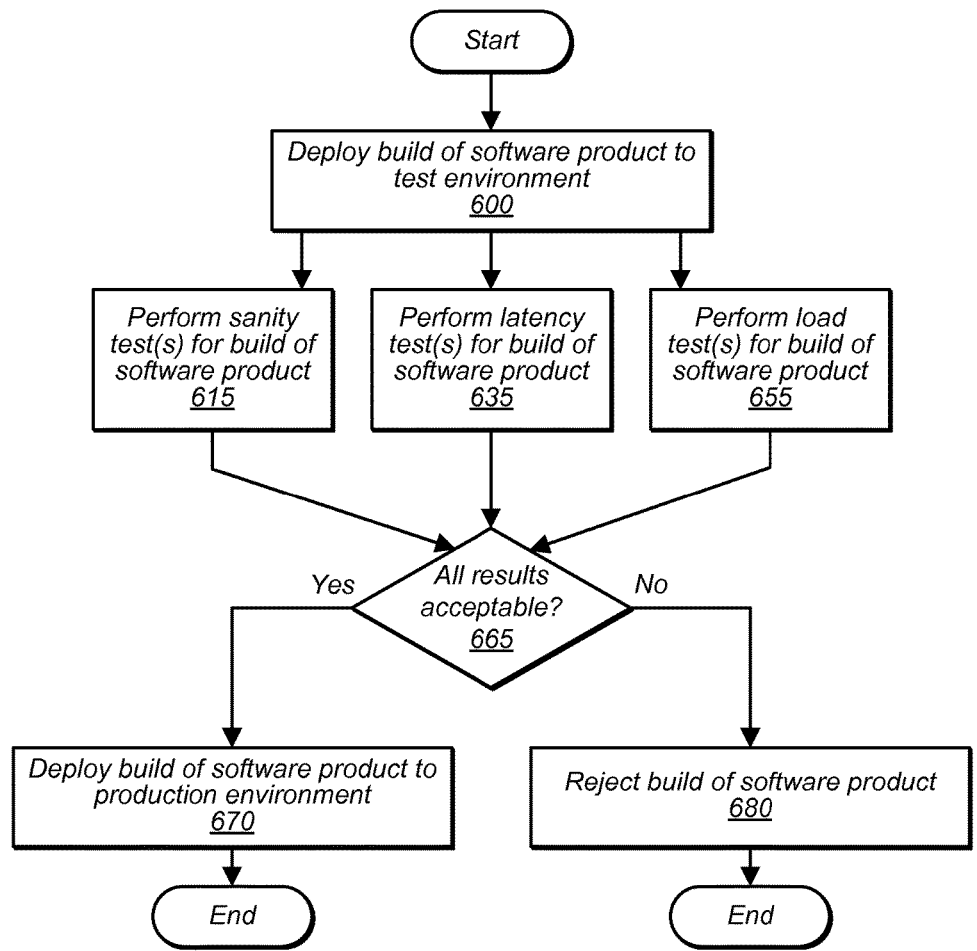
FIG. 6B is a flowchart illustrating further aspects of a method for performance testing in a software deployment pipeline, according to one embodiment.

FIG. 6B is a flowchart illustrating further aspects of a method for performance testing in a software deployment pipeline, according to one embodiment. As shown in 600, a build of a software product may be deployed to a test environment. In some embodiments, the build may be automatically deployed in response to the generation of the build (e.g., by compiling a set of program code) and/or the submission of the build or the corresponding program code by a developer to a deployment pipeline.

As shown in 615, 635, and 655, various types of performance tests may be performed in a substantially concurrent manner. The performance tests may be automatically performed based on the deployment of the build to the test environment, on the checkin of the program code, on the generation of the build, or on any combination thereof. As shown in 615, one or more sanity tests may be automatically performed for the build of the software product in the test environment. One or more performance metrics may be collected in conjunction with the sanity test(s). As shown in 635, one or more latency tests may be automatically performed for the build of the software product in the test environment. One or more performance metrics may be collected in conjunction with the latency test(s). As shown in 655, one or more load tests may be automatically performed for the build of the software product in the test environment. One or more performance metrics may be collected in conjunction with the load test(s). In various embodiments, various combinations of the tests shown in 615, 635, and 655 may be performed. In various embodiments, some of the tests shown in 615, 635, and 655 may be omitted.

As shown in 665, the results of the sanity test(s), latency test(s), and load test(s) may be deemed acceptable or unacceptable, e.g., based on one or more heuristics and the one or more performance metrics. If the results are acceptable, then as shown in 670, the build of the software product may be automatically deployed to a production environment. If the results are not acceptable, then as shown in 680, the build is rejected.

Illustrative Computer System

In at least some embodiments, a computer system that implements a portion or all of one or more of the technologies described herein, such as the deployment pipeline 100 and/or software product approval system 200, may include a general-purpose computer system that includes or is configured to access one or more computer-readable media. FIG. 7 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 2B, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above with respect to FIGS. 1 through 6 for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the figures (e.g., FIGS. 6A and 6B) and described herein represent exemplary embodiments of methods. The methods may be implemented in software, hardware, or a combination thereof. In various of the methods, the order of the steps may be changed, and various elements may be added, reordered, combined, omitted, modified, etc. Various of the steps may be performed automatically (e.g., without being directly prompted by user input, without human intervention, or in response to a programmatic determination made without human input, etc.) and/or programmatically (e.g., according to program instructions).

Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A computer-implemented method, comprising:
    deploying, based at least in part on a checkin of a software product, a build of the software product to a test environment prior to the build of the software product being deployed to a production environment;
    generating a plurality of test transactions;
    automatically performing a plurality of performance tests on the build of the software product in the test environment in response to said deploying the build of the software product to the test environment, wherein the performance tests include:
        a performance test selected from a load test category, wherein each of the performance tests in the load test category comprises increasing a rate of transactions to the test environment to which the software product has been deployed until a predetermined latency threshold or an error rate threshold is reached, and wherein the performance tests are performed using at least one of the plurality of test transactions generated; and
        another performance test selected from a sanity test category or a latency test category;
    collecting a plurality of performance metrics based on the plurality of performance tests, wherein at least one performance test is configured in accordance with one or more respective pre-defined specifications;
    determining whether the build of the software product passes or fails one or more of the performance tests based on one or more of the performance metrics; and
    deploying the build of the software product to the production environment if the build of the software product passes the plurality of performance tests, and rejecting the build of the software product if the build of the software product fails one or more of the performance tests.

2. The method as recited in claim 1, wherein performing the plurality of performance tests on the build of the software product comprises performing one or more sanity tests based on a typical amount of load, and wherein determining whether the build of the software product passes or fails one or more of the performance tests comprises determining whether an error rate for one or more transaction types exceeds a threshold.

3. The method as recited in claim 1, wherein performing the performance tests on the build of the software product comprises performing one or more latency tests, and wherein determining whether the build of the software product passes or fails one or more of the performance tests comprises determining whether the plurality of performance metrics exceed a latency metric for one or more transaction types.

4. The method as recited in claim 1, wherein performing the plurality of performance tests on the build of the software product comprises performing one or more load tests, and wherein determining whether the build of the software product passes or fails the performance tests comprises determining whether one or more hosts achieve a target transaction frequency or a target number of concurrent connections.

5. The method as recited in claim 1, wherein determining whether the build of the software product passes or fails the performance tests based on the performance metrics comprises comparing one or more of the performance metrics to one or more performance metrics for a prior build of the software product.

6. The method as recited in claim 1, further comprising:
    performing one or more additional performance tests on a prior build of the software product, wherein the one or more additional performance tests are performed concurrently with the plurality of performance tests; and
    collecting one or more additional performance metrics based on the one or more additional performance tests;
    wherein determining whether the build of the software product passes or fails one or more of the performance tests based on one or more of the performance metrics comprises comparing at least one of the performance metrics with the one or more additional performance metrics.

7. A system, comprising:
    one or more computers configured to implement a software build approval system, wherein the software build approval system comprises:
        a transaction generator module configured to generate a plurality of test transactions;
        a test environment deployment module configured to deploy, based at least in part on a checkin of a software product, a build of the software product to a test environment prior to the build of the software product being deployed to a production environment, wherein the test environment comprises one or more hosts configured to execute the build of the software product;

a performance testing module configured to:
apply a plurality of performance tests, using the plurality of test transactions generated by the transaction generator module, to the build of the software product in the test environment, wherein the performance tests include:
a performance test selected from a load test category, wherein for the performance tests in the load test category a rate of transactions to the one or more hosts configured to execute the build of the software product is increased until a predetermined latency threshold or an error rate threshold is reached; and
another performance test selected from a sanity test category or a latency test category;
collect a plurality of performance metrics based on the plurality of performance tests; and
determine whether to accept or reject the build of the software product based on the plurality of performance metrics; and
a production environment deployment module configured to:
deploy the build of the software product to a production environment in response to a determination to accept the build of the software product based on the plurality of performance metrics collected; and
reject the build of the software product in response to a determination to reject the build of the software product based on the plurality of performance metrics collected.

8. The system as recited in claim 7, wherein the performance testing module is further configured to:
retrieve one or more performance metrics for a prior build of the software product; and
determine whether to accept or reject the build of the software product based on a comparison between at least one of the plurality of performance metrics for the build of the software product and the one or more performance metrics for the prior build of the software product.

9. The system as recited in claim 7, wherein the performance testing module is further configured to:
apply one or more additional performance tests to a prior build of the software product in an additional test environment;
collect one or more additional performance metrics based on the additional performance tests; and
determine whether to accept or reject the build of the software product based on a comparison between the plurality of performance metrics and the one or more additional performance metrics.

10. The system of claim 7, wherein at least one of the performance tests is configured to specify one or more test parameters to simulate a respective production load.

11. A system, comprising:
one or more computing devices having one or more hardware processors and memory and configured to implement one or more services, wherein the one or more services are configured to:
deploy, based at least in part on a checkin of a software product, a build of a software product to a test environment prior to the build of the software product being deployed to a production environment;
generate a plurality of transactions for the test environment;
automatically cause the build of the software product to process at least some of the generated transactions in performance tests of the test environment, wherein the performance tests include:
a performance test selected from a load test category, wherein for the performance tests in the load test category a rate of transactions to the test environment to which the software product has been deployed is increased until a predetermined latency threshold or an error rate threshold is reached, and wherein the test environment comprises one or more test hosts, each test host configured to simulate a respective production condition; and
another performance test selected from a sanity test category or a latency test category;
collect a plurality of performance metrics for the build of the software product based on the plurality of transactions processed in the test environment;
determine whether to pass or fail the build of the software product based on whether the performance metrics collected satisfy one or more predefined criteria;
automatically deploy the build of the software product to a production environment in response to a determination to pass the build of the software product based on the performance metrics collected; and
automatically reject the build of the software product in response to a determination to fail the build of the software product failed based on the performance metrics collected.

12. The system as recited in claim 11, wherein, in automatically causing the build of the software product to process the plurality of transactions in the test environment, the one or more services are configured to implement one or more sanity tests based on a typical amount of load, and wherein at least one of the performance metrics satisfies a corresponding predefined criterion if an error rate for one or more transaction types does not exceed a threshold.

13. The system as recited in claim 11, wherein, in automatically causing the build of the software product to process the plurality of transactions in the test environment, the one or more services are configured to implement one or more latency tests, and wherein at least one of the performance metrics satisfies a corresponding predefined criterion if the at least one of the performance metrics does not exceed a latency metric for one or more transaction types.

14. The system as recited in claim 11, wherein, in automatically causing the build of the software product to process the plurality of transactions in the test environment, the one or more services are configured to implement one or more load tests, and wherein at least one of the performance metrics satisfies the one or more predefined criteria if one or more hosts achieve a target transaction frequency or a target number of concurrent connections.

15. The system as recited in claim 11, wherein the one or more services are configured to:
automatically cause an additional build of the software product to process a plurality of additional transactions in an additional test environment; and
collect one or more additional performance metrics for the additional build of the software product based on the plurality of additional transactions in the additional test environment;
wherein at least one of the performance metrics satisfies the one or more predefined criteria if one of the performance metrics is within a predefined range of a corresponding one of the one or more additional metrics.

16. A non-transitory computer-readable storage medium storing program instructions computer-executable to perform:

deploying, based on a checkin of a set of program code, the set of program code to a test environment distinct from a production environment and comprising one or more test hosts, prior to the set of program code being deployed to the production environment;

generating a plurality of test transactions;

applying a plurality of performance tests, using at least some of the generated test transactions, to the set of program code in the test environment in response to said deploying the set of program code to the test environment, wherein the plurality of performance tests include:

a performance test selected from a load test category, wherein each of the performance tests in the load test category comprises increasing a rate of transactions to the test environment to which the software product has been deployed until a predetermined latency threshold or an error rate threshold is reached; and another performance test selected from a sanity test category or a latency test category;

collecting a plurality of performance metrics based on the plurality of performance tests, wherein at least one of the performance tests is configured to simulate a respective production environment condition;

determining whether to accept or reject the set of program code based at least in part on the performance metrics; and deploying the set of program code to a production environment if said determining determines to accept the set of program code based on the performance metrics, and rejecting the set of program code if said determining determines to reject the set of program code based on the performance metrics.

17. The non-transitory computer-readable storage medium as recited in claim 16, wherein applying the performance tests to the set of program code comprises performing one or more sanity tests based on a typical amount of load, and wherein the set of program code is rejected if an error rate for one or more transaction types exceeds a threshold.

18. The non-transitory computer-readable storage medium as recited in claim 16, wherein applying the performance tests to the set of program code comprises performing one or more latency tests in the test environment, and wherein the set of program code is rejected if one of the performance metrics exceed a latency metric for one or more transaction types.

19. The non-transitory computer-readable storage medium as recited in claim 16, wherein applying the performance tests to the set of program code comprises performing one or more load tests in the test environment, and wherein the set of program code is rejected if the one or more hosts fails to achieve a target transaction frequency or a target number of concurrent connections.

20. The non-transitory computer-readable storage medium as recited in claim 16, wherein a particular performance test is configured to generate a synthetic load that is specified by one or more parameters of a performance test description of the particular performance test.

* * * * *